United States Patent
Le Pallec et al.

(10) Patent No.: US 9,264,212 B2
(45) Date of Patent: Feb. 16, 2016

(54) METHOD FOR DISTRIBUTING TIME WITHIN SYNCHRONOUS ETHERNET AND SONET/SDH DOMAINS

(75) Inventors: Michel Le Pallec, Nozay (FR); Dinh Thai Bui, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 453 days.

(21) Appl. No.: 13/806,212

(22) PCT Filed: Jun. 30, 2011

(86) PCT No.: PCT/EP2011/061027
§ 371 (c)(1),
(2), (4) Date: Jan. 23, 2013

(87) PCT Pub. No.: WO2012/001114
PCT Pub. Date: Jan. 5, 2012

(65) Prior Publication Data
US 2013/0121705 A1    May 16, 2013

(30) Foreign Application Priority Data
Jun. 30, 2010   (FR) ...................................... 10 02755

(51) Int. Cl.
*H04B 10/00* (2013.01)
*H04L 7/00* (2006.01)
*H04J 3/06* (2006.01)

(52) U.S. Cl.
CPC ............... *H04L 7/0075* (2013.01); *H04J 3/065* (2013.01); *H04J 3/0664* (2013.01); *H04J 3/0673* (2013.01); *H04J 2203/0085* (2013.01); *H04J 2203/0089* (2013.01)

(58) Field of Classification Search
CPC ..... H04J 3/0697; H04J 3/0658; H04J 3/0067; H04J 3/0679; H04L 7/0075
USPC ............. 398/154, 155, 58, 79, 45, 48, 49, 46, 398/47; 370/503, 350, 348, 507, 509, 530, 370/389
See application file for complete search history.

(56) References Cited

U.S. PATENT DOCUMENTS 8,094,687 B2 *  1/2012  Cheng et al. .................. 370/503
8,446,896 B2 *  5/2013  Bedrosian ..................... 370/350
(Continued)

FOREIGN PATENT DOCUMENTS

CN   101299749   11/2008
EP    1075102     2/2001
(Continued)

OTHER PUBLICATIONS

J-L Ferrant et al; Synchronous Ethernet: A Method to Transport Synchronization; IEEE Communications Magazine, IEEE Service Center, Piscataway, US; vol. 46, No. 9; Sep. 1, 2008; pp. 126-134; XP011234298; ISSN: 0163-6804, DOI: DOI:10.1109/MCOM.2008. 4623717.

*Primary Examiner* — Hanh Phan
(74) *Attorney, Agent, or Firm* — Patti & Malvone Law Group, LLC

(57) ABSTRACT

The embodiments of the present invention pertain to a method for distributing time between a first and a second Synchronous Ethernet "SyncE" domain, the first and second domains being interconnected by a third, Synchronous Optical Networking/Synchronous Digital Hierarchy "SDH-SONET" domain in which a time-associated reference parameter is distributed, through Synchronous Ethernet "SyncE" domains, by means of at least one additional Type Length Value "TLV" field of an Ethernet Synchronization Messaging Channel "ESMC" message and a corresponding time-associated reference parameter is distributed, through the Synchronous Optical Networking/Synchronous Digital Hierarchy "SONET-SDH" domain by means of at least one additional Type Length Value "TLV" field within a message of the IEEE 1588 V2 protocol.

15 Claims, 4 Drawing Sheets

(56) References Cited

U.S. PATENT DOCUMENTS

2009/0016384 A1    1/2009   Cheng et al.
2009/0207863 A1*   8/2009   Cheng et al. .................. 370/498
2010/0085990 A1    4/2010   Belhadj et al.

FOREIGN PATENT DOCUMENTS

EP     2026510    2/2009
EP     2071760    6/2009

* cited by examiner a) b) c)

METHOD FOR DISTRIBUTING TIME WITHIN SYNCHRONOUS ETHERNET AND SONET/SDH DOMAINS

BACKGROUND OF THE INVENTION

The embodiments of the present invention pertain to the domain of communication networks, and more particularly to the distribution of time between two Synchronous Ethernet (SyncE) domains interconnected by a Synchronous Optical Networking/Synchronous Digital Hierarchy (SONET/SDH) domain. This is because the SONET/SDH and SyncE domains are compatible from the viewpoint of the physical distribution of a synchronization frequency as depicted in FIG. 1, wherein Synchronized Ethernet (syncE) nodes E (FIG. 1b) or hybrid nodes H (FIG. 1c), meaning those that have both SONET/SDH and SyncE, are inserted into a synchronization chain comprising SONET/SDH nodes S and synchronization units (Synchronization Supply Unit) SSU.

The synchronization status is therefore distributed by Ethernet Synchronization Messaging Channel messages (ESMC) that contain Type Length Value (TLV) structures as specified in protocol 802.3 of the Institute of Electrical and Electronic Engineers (IEEE 802.3).

At present, only one of those TLV structures is standardized by the International Telecommunications Union (ITU-T); this is the TLV field indicating the synchronization signal's quality level (QL-TLV) in order to maintain compatibility with SONET/SDH.

Proposals to add TLV structures have, however, been proposed within UIT-T in order to optimize the use of those ESMC messages, and particularly to introduce a TLV structure that comprises a timestamp value so as to distribute time through a SyncE domain.

In the configuration described in FIG. 2 in which two SyncE domains 1 are interconnected by one SONET/SDH domain 3, the additional TLV structures 7, if any (meaning those besides the QL-TLV structure 9) are filtered within the SyncE-SONET/SDH interface. This is because this information is not defined in the SONET/SDH header, and there is no longer any way to extend the format of those headers without deeply impacting (i.e. hardware changes) the large amount of SONET/SDH equipment already deployed on the premises.

There is therefore a need to propose a method that would make it possible to distribute time between two ESMC domains interconnected by a SDH/SONET domain.

SUMMARY OF THE INVENTION

For this reason, the embodiments of the present invention pertaining to a method for distributing time between a first and a second Synchronous Ethernet "SyncE" domain, said first and second domains being interconnected by a third, Synchronous Optical Networking/Synchronous Digital Hierarchy "SDH-SONET" domain in which a time-associated reference parameter is distributed, through Synchronous Ethernet "SyncE" domains, by means of at least one additional Type Length Value "TLV" field of an Ethernet Synchronization Messaging Channel "ESMC" message, and a corresponding time-associated reference parameter is distributed, through the Synchronous Optical Networking/Synchronous Digital Hierarchy "SONET-SDH" domain by means of at least one additional Type Length Value "TLV" field within a message of the IEEE 1588 V2 protocol.

According to another aspect of the present invention, the IEEE 1588 V2 protocol message is a SYNC message.

According to an additional aspect of the present invention, the IEEE 1588 V2 protocol message is an ANNOUNCE message.

According to another aspect of the present invention, the time-associated reference parameter distributed through the Synchronous Ethernet "SyncE" domains comprises at least one timestamp value.

According to an additional aspect of the present invention, the corresponding time-associated reference parameter distributed through the Synchronous Optical Networking/Synchronous Digital Hierarchy "SONET-SDH" domain comprises a timestamp value.

According to an additional aspect of the present invention, a mapping from at least one additional Type Length Value "TLV" field of the received Ethernet Synchronization Messaging Channel "ESMC" message to the IEEE1588V2 protocol's message is carried out within the source border hybrid node by the synchronization network manager so as to allow a alteration to the value of said at least one additional Type Length Value "TLV" field of the IEEE1588V2 protocol's message by the nodes of the Synchronous Optical Networking/Synchronous Digital Hierarchy "SONET-SDH" domain.

According to another aspect of the present invention, the IEEE1588V2 protocol's message is encapsulated into a Multiprotocol Label Switching "MPLS" tunnel.

According to an additional aspect of the present invention, the IEEE1588V2 protocol's message is encapsulated in a Virtual Local Area Network "VLAN" tunnel.

According to an additional aspect of the present invention, the tunnel carrying the IEEE1588V2 protocol's message takes the same route as the tuning signal transmitted over the physical layer.

According to another aspect of the present invention, a mapping from at least one additional Type Length Value "TLV" field of the received IEEE1588V2 protocol message to the Ethernet Synchronization Messaging Channel "ESMC" message is performed within the destination border hybrid node by the synchronization network manager.

According to another aspect of the present invention, the time-associated reference parameter distributed through Synchronous Ethernet "SyncE" domains comprises a master clock value of the SyncE domain.

According to an additional aspect of the present invention, the corresponding time-associated reference parameter distributed through the Synchronous Optical Networking/Synchronous Digital Hierarchy "SONET-SDH" domain comprises an offset value between the master clock of the Synchronous Ethernet "SyncE" domain and a master clock of the Synchronous Optical Networking/Synchronous Digital Hierarchy "SONET-SDH" domain.

According to another aspect of the present invention, the clock offset value is determined within the source border hybrid node.

According to an additional aspect of the present invention, the ANNOUNCE message is encapsulated within a Multiprotocol Label Switching "MPLS" tunnel.

According to an additional aspect of the present invention, the master clock value of the first Synchronous Ethernet "SyncE" domain is retrieved within the destination border hybrid node based on the master clock value of the Synchronous Optical Networking/Synchronous Digital Hierarchy "SONET-SDH" domain and the offset value transmitted by the ANNOUNCE message.

According to an additional aspect of the present invention, a mapping of the TLV fields of the Ethernet Synchronization Messaging Channel "ESMC" message to the new TLV fields of the ANNOUNCE message is carried out so as to allow the updating of those fields within the nodes of the SONET/SDH domain.

The embodiments of the present invention also pertain to a source border hybrid node comprising means configured to:
- receive an Ethernet Synchronization Messaging Channel "ESMC" message comprising at least one Type Length Value "TLV" field associated with a master clock value of a Synchronous Ethernet "SyncE" domain,
- map the Type Length Value "TLV" fields of the Ethernet Synchronization Messaging Channel "ESMC" message, at least one of which is associated with a master clock value, with additional Type Length Value "TLV" fields of a SYNC or ANNOUNCE message of the 1588V2 protocol,
- encapsulate and transmit the SYNC or ANNOUNCE message comprising said additional Type Length Value "TLV" fields within a tunnel through a Synchronous Optical Networking/Synchronous Digital Hierarchy "SONET-SDH" domain.

The embodiments of the present invention also pertain to a destination border hybrid node comprising means configured to:
- receive and unencapsulate a SYNC or ANNOUNCE message of the 1588V2 protocol comprising Type Length Value "TLV" fields, at least one of which is associated with a master clock value, said message having been transmitted within a tunnel through a Synchronous Optical Networking/Synchronous Digital Hierarchy "SONET-SDH" domain,
- map the Type Length Value "TLV" fields of the transmitted SYNC or ANNOUNCE message, at least one of which is associated with a master clock value, with Type Length Value "TLV" fields of a Ethernet Synchronization Messaging Channel "ESMC" message,
- transmit the Ethernet Synchronization Messaging Channel "ESMC" message comprising the Type Length Value "TLV" fields, at least one of which is associated with a master clock value, through a Synchronous Ethernet "SyncE" domain.

The embodiments of the present invention also pertain to a source border hybrid node comprising means configured to:
- receive an Ethernet Synchronization Messaging Channel "ESMC" message comprising Type Length Value "TLV" fields, at least one of which is associated with a master clock value of a SyncE domain,
- determine the offset between the master clock value of the received Synchronous Ethernet "SyncE" domain and a master clock value of the Synchronous Optical Networking/Synchronous Digital Hierarchy "SONET-SDH" domain,
- encode and insert the offset value within a field of an ANNOUNCE message of the 1588V2 protocol,
- encapsulate and transmit the ANNOUNCE message comprising a field associated with a clock offset value within a tunnel through a Synchronous Optical Networking/Synchronous Digital Hierarchy "SONET-SDH" domain.

The embodiments of the present invention also pertain to a destination border hybrid node comprising means configured to:
- receive and unencapsulate an ANNOUNCE message of the 1588V2 protocol comprising a field associated with a clock domain value transmitted within a tunnel through a Synchronous Optical Networking/Synchronous Digital Hierarchy "SONET-SDH" domain,
- retrieve the master clock value of the Synchronous Ethernet "SyncE" domain based on the master clock value of the Synchronous Optical Networking/Synchronous Digital Hierarchy "SONET-SDH" domain and the received clock offset value,
- transmit an Ethernet Synchronization Messaging Channel "ESMC" message comprising a Type Length Value "TLV" field associated with the master clock value of the retrieved Synchronous Ethernet "SyncE" domain.

BRIEF DESCRIPTION OF THE DRAWINGS

Other characteristics and benefits of the invention will become apparent from the following description, given with reference to the attached drawings, which by way of a non-limiting example depict one possible embodiment.

In these drawings.

DETAILED DESCRIPTION OF THE INVENTION

In the following description, generally:

The term "ESMC" stands for Ethernet Synchronization Messaging Channel;

The term "IEEE" stands for the Institute of Electrical and Electronic Engineers;

The term "SONET" stands for Synchronous Optical Networking;

The term "SDH" stands for Synchronous Digital Hierarchy;

The term "TLV" stands for Type Length Value;

The term "QL" Quality Level;

The term "SyncE" stands for Synchronous Ethernet;

The term "MPLS" stands for Multi Protocol Label Switching;

The term "encapsulation" refers to encapsulation with respect to packets, in which the packet is enclosed within a protocol structure (comprising a header, checksum, etc.) so as to allow it to be transmitted into another domain managed by a different protocol; the term "unencapsulation" refers to the reverse operation, the outcome of which is the initial packet.

The term "border hybrid node" refers to a node located at the junction between two domains (meaning between a SONET/SDH domain and a SyncE domain in the present situation) and comprising both SONET/SDH and SyncE interfaces.

The embodiments of the present invention pertain to the distribution of time between two SyncE domains interconnected by a SONET/SDH domain using an additional Type Length Value transmitted within an ESMC message in SyncE domains and incorporated into a SYNC (or ANNOUNCE) message of the IEEE1588V2 protocol of the SONET/SDH domain.

Figure 1:
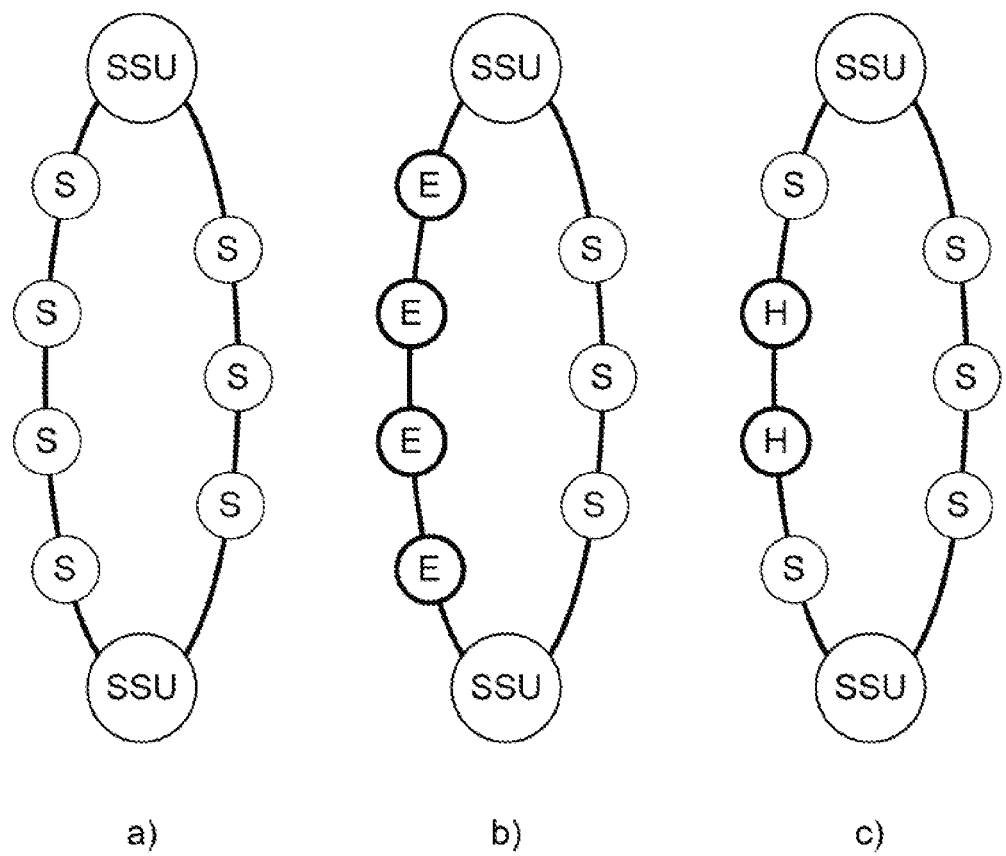
FIG. 1 depicts a schematic of three types of synchronization chains, the first one (a) comprising only SDH/SONET nodes, the second one (b) comprising SDH/SONET nodes and Synchronous Ethernet (SyncE) nodes, and the third one (c) comprising SDH/SONET nodes and SDH/SONET-SyncE hybrid nodes.
Figure 2:
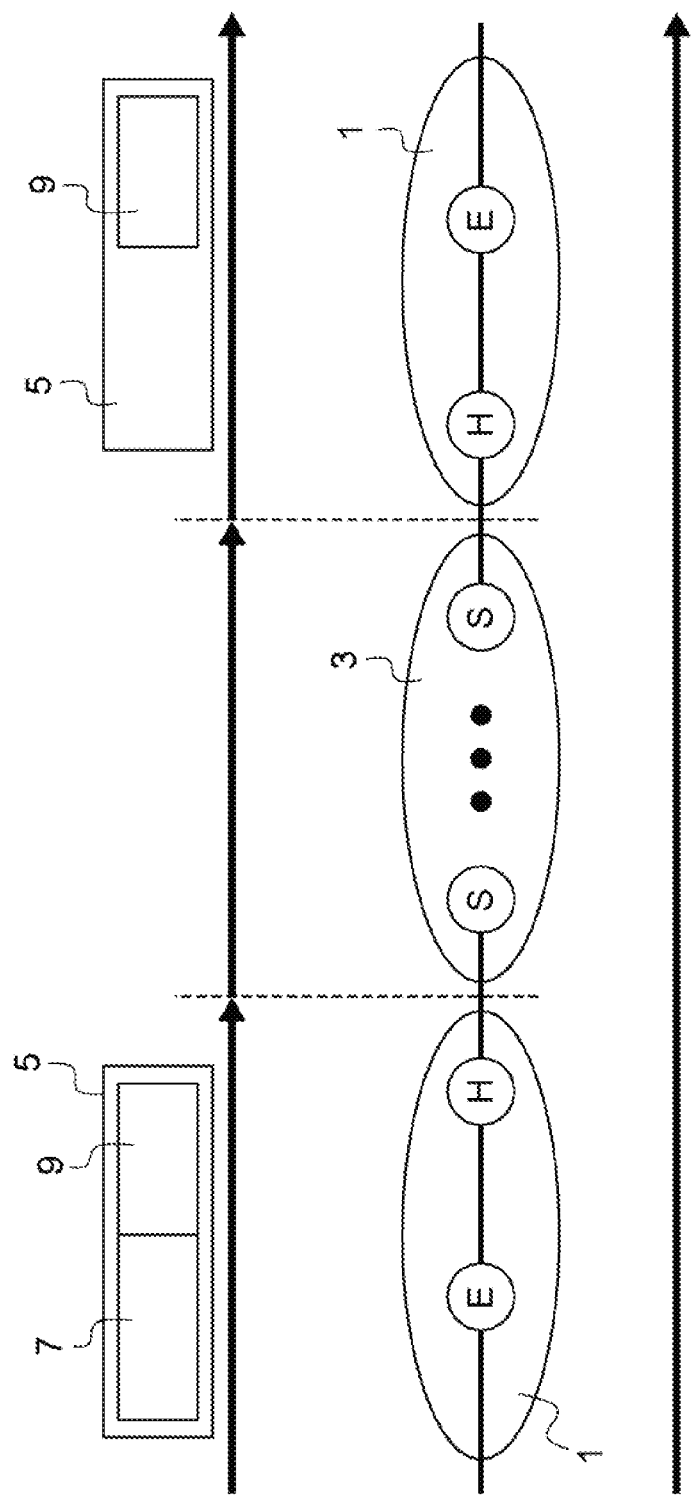
FIG. 2 depicts a diagram of a synchronization configuration in which two SyncE domains are interconnected by a SDH/SONET domain.
Figure 3:
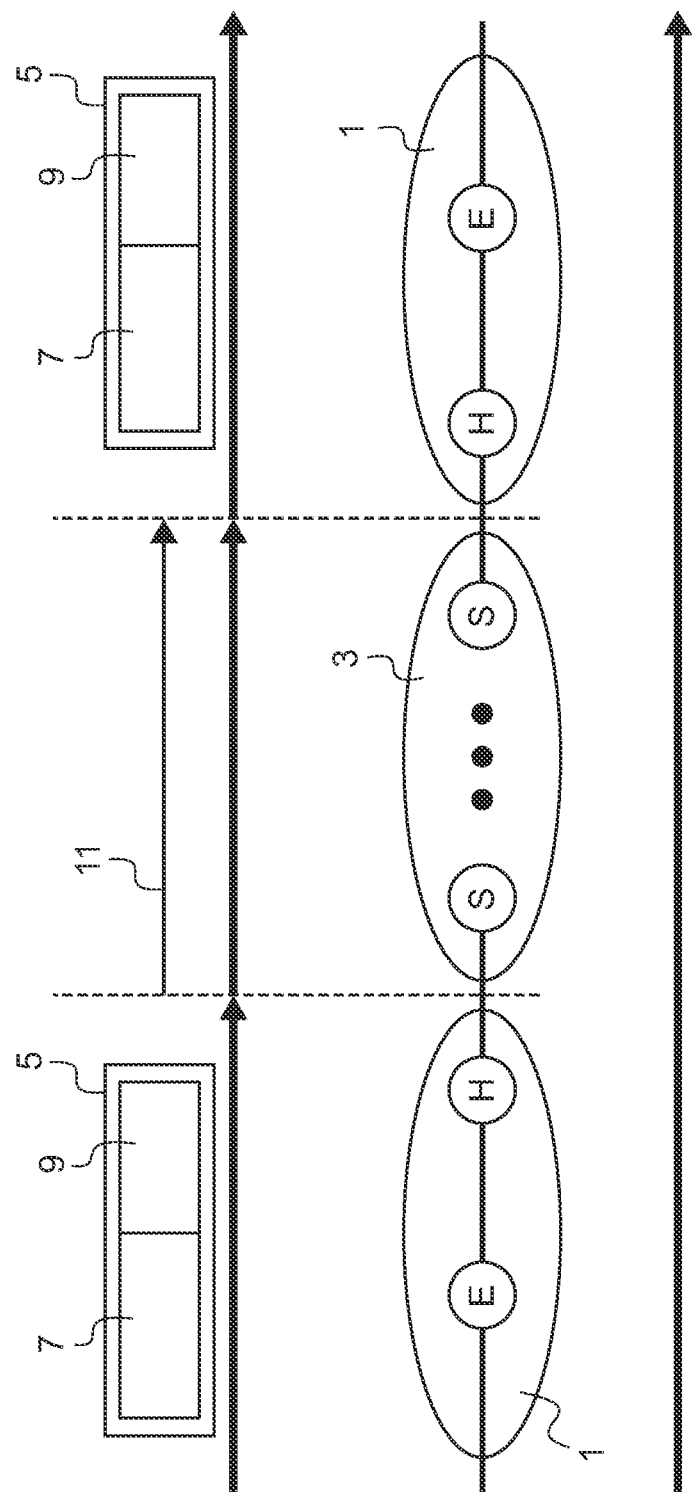
FIG. 3 depicts the means of distributing time within the domains presented in FIG. 2.

FIG. 3 refers to the configuration presented in FIG. 2, the time reference is distributed by the additional TLV fields 7 within the SyncE domains 1 and within a (SYNC (or ANNOUNCE)) message 11 of the 1588V2 protocol within the SONET/SDH domain 3. It should be noted that other protocols, like Network Time Protocol (NTP), may be used to carry the timestamp values within the SONET/SDH domain.

Within the SyncE domains 1, the time may be distributed by timestamp values inserted into ESMC messages 5 in an additional TLV field 7.

Figure 4:
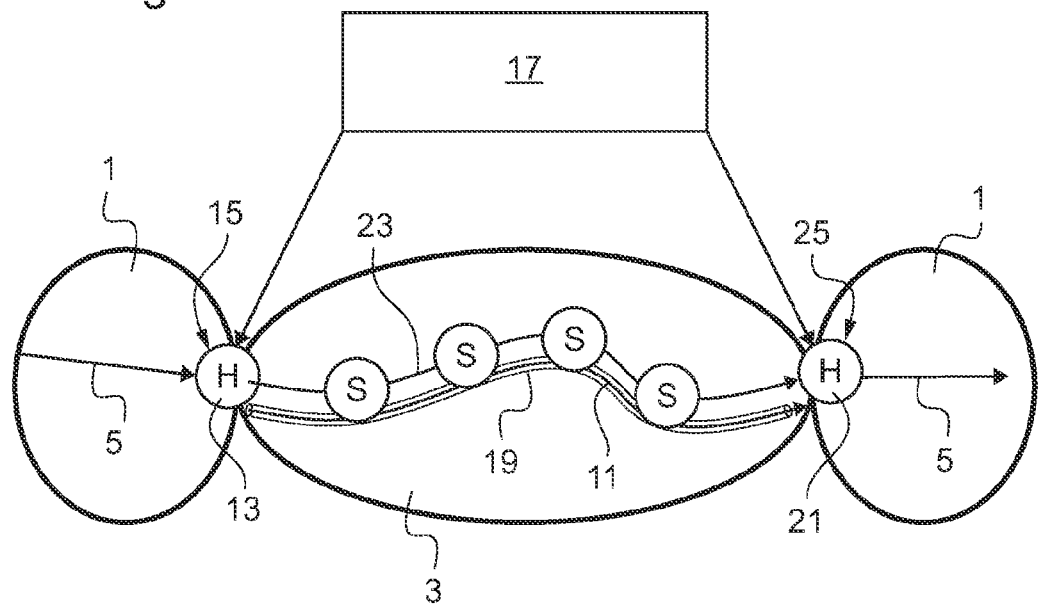
FIG. 4 depicts a distribution of time within which a timestamp value obtained by mapping the value received within an additional TLV field of an ESMC message is transmitted by an additional TLV field of a message of the IEEE1588V2 protocol in the SONET/SDH domain through a MPLS or VLAN tunnel.

According to a first embodiment depicted in FIG. 4, the ESMC extensions, and in particular, a timestamp value carried by an additional TLV field 7 is received by a source border 13 hybrid node H located at the interface between a SyncE domain 1 and a SONET/SDH domain 3. A mapping 15 is then performed by the hybrid node in order to transpose the additional TLV fields 7 of the ESMC message 5 onto a SYNC (or ANNONCE) message 11 of the IEEE1588V2 protocol intended to be transmitted through the SONET/SDH domain 3. This mapping enables, if necessary (for example, if there is a field to count the number of nodes encountered, i.e. a "hop count"), an updating of the additional TLV fields 7 of the message 11 of the IEEE1588V2 protocol by the nodes S of the SONET/SDH domain 3.

Additionally, in order to ensure good working order, the message 11 of the IEEE1588V2 protocol must follow the route of the tuning signals 23 transmitted on the physical layer (the SYNC (or ANNOUNCE) message 11 being transmitted on the packet layer). This constraint is guaranteed by creating a tunnel 19, for example a Multi Protocol Label Switching (MPLS) or Virtual Local Area Network (VLAN) tunnel, to the destination border hybrid node 21 and following the route of the tuning signals 23.

Thus, the source border hybrid node 13 receives information from the network manager and the synchronization network manager 17, which allow it to create said tunnel 19 (this information is also transmitted to the destination border hybrid node 21).

Additionally, it should be noted that in order to maintain the same responsiveness within the different domains (which is particularly important in the context of time distribution), the rate of SYNC (or ANNOUNCE) messages 11 (the message rate) must be configured so as to be greater than or equal to the ESMC messages' heartbeat period.

Furthermore, as described above, within the nodes S of the SONET/SDH domain 3, the TLV fields, such as, for example the fields that correspond to the number of nodes encountered ("hop count number") or the route ("trace route"), are updated, with the proposed solution therefore enabling the transmission of various types of TLV fields.

Within the destination border 21 hybrid node H, when a SYNC (or ANNOUNCE) message 11 is received, a mapping 25 that is the reverse of the mapping 15 carried out within the source border hybrid node 13 is carried out, which makes it possible to transpose the TLV fields of the SYNC (or ANNOUNCE) message to an ESMC message 5 in order to be transmitted through the second SyncE domain 1.

Figure 5:
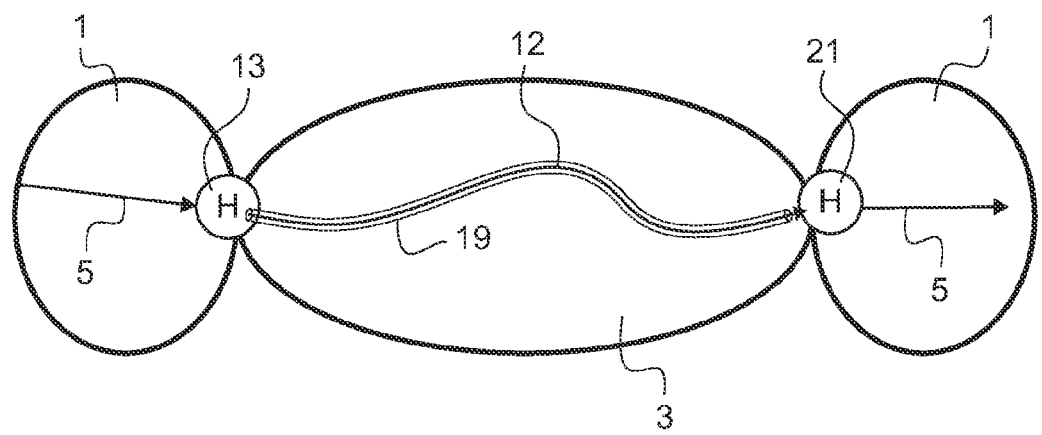
FIG. 5 depicts a distribution of time within which a clock offset value obtained by comparing the master clocks of the SyncE and SONET/SDH domains is transmitted by an additional TLV field of an ANNOUNCE message within the SONET/SDH domain through an MPLS tunnel.

According to a second embodiment presented in FIG. 5, within the source border hybrid node H, the TLV fields of a received ESMC message 5 particularly comprise a master clock value Tin(t) of the SyncE 1 domain. This value is then compared to the master clock value Tref(t) of the field SONET/SDH 3, distributed within the SONET/SDH domain 3 by the 1588V2 protocol, in order to determine the offset (T_offset(t)=Tin(t)−Tref(t)) between the two master clocks.

The presence of multiple master clocks is explained by the fact that the different domains are generally managed by different network operators, which each have their own master clock. It should also be noted that two reference clocks (Primary Reference Clock) (associated with two different domains) as specified in the recommendation UIT_T G.811 may diverge greatly from one another by more than 1 µs per day.

In such a case, the offset value T_offset is then encoded into the source border hybrid node 13 and inserted into a new TLV field of an ANNOUNCE message 12 of the IEEE 1588V2 protocol. A mapping of the TLV fields of the ESMC message onto the new TLV fields of the ANNOUNCE message 12 may also be carried out so as to allow the updating of those fields within the nodes of the SONET/SDH domain 3.

Said message is then encapsulated within a tunnel 19, for example an MPLS tunnel, to be transmitted to the destination border hybrid node 21.

Furthermore, it should be noted that the two master clock values (Tin(t) and Tref(t)) may also be transmitted within the TLV field instead of the offset value.

Within the destination border 21 hybrid node H, whenever an ANNOUNCE message 12 comprising an offset value, the reference time of the master clock of the SyncE (Tin(t+δt) domain is retrieved from the master clock value of the SONET/SDH domain 3 distributed by the 1588V2 protocol (Tref(t+δt) and the clock offset transmitted by the ANNOUNCE message 12 (T_offset (t)):

$$Tin(t+\delta t) = Tref(t+\delta t) + T\_offset(t)$$

Likewise, the clock offset value may be transmitted through the SONET/SDH domain 3 by a reserved field of an ANNOUNCE message 12 of the 1588V2 protocol.

Once the master clock value of the SyncE domain 1 (Tin (t+δt) has been retrieved from the destination border hybrid node, the time distribution may then be performed through the second SyncE domain 1 by means of ESMC messages 5.

This way, the embodiments of the present invention make it possible to transmit the time between a first and second SyncE domains interconnected by a SONET/SDH domain using additional TLV fields of ESMC messages within SyncE domains and SYNC or ANNOUNCE messages of the 1588V2 protocol within the SONET/SDH domain.

The invention claimed is:

1. A method for distributing time between a first and a second Synchronous Ethernet "SyncE" domain, said first and second domains being interconnected by a third, Synchronous Optical Networking/Synchronous Digital Hierarchy "SONET/SDH" domain, comprising the steps of:

distributing a time-associated reference parameter, through SyncE domains, by means of at least one additional Type Length Value "TLV" field of an Ethernet Synchronization Messaging Channel "ESMC" message; and distributing a corresponding time-associated reference parameter through the SONET/SDH domain by means of at least one additional Type Length Value "TLV" field within a message of the IEEE 1588 V2 protocol.

2. A method for distributing time according to claim 1 wherein the IEEE 1588 V2 protocol message is a SYNC message.

3. A method for distributing time according to claim 1 wherein the IEEE 1588 V2 protocol message is an ANNOUNCE message.

4. A method for distributing time according to claim 3 wherein the time-associated reference parameter distributed through SyncE domains comprises a master clock value of the SyncE domain.

5. A method for distributing time according to claim 4 wherein the corresponding time-associated reference parameter distributed through the SONET/SDH domain comprises an offset value between a master clock of the SyncE and a master clock of the SONET/SDH domain.

6. A method for distributing time according to claim 4, wherein the master clock value of the first Synchronous Ethernet "SyncE" domain is retrieved within the destination border hybrid node based on the master clock value of the SONET/SDH domain and on the offset value transmitted by the ANNOUNCE message.

7. A method for distributing time according to claim 1, wherein the time-associated reference parameter distributed through Synchronous Ethernet "SyncE" domains comprises a master clock value of the SyncE domain.

8. A method for distributing time according to claim 1, wherein the corresponding time-associated reference parameter distributed through the SONET/SDH domain comprises a timestamp value.

9. A method for distributing time according to claim 1, wherein a mapping from at least one additional TLV field of the received ESMC message to the IEEE1588V2 protocol's message is carried out within a source border hybrid node by a synchronization network manager so as to allow an alteration to the value of said at least one additional TLV field of the IEEE1588V2 protocol's message by the SONET/SDH domain.

10. A method for distributing time according to claim 9, wherein a mapping from at least one additional TLV field of the received IEEE1588V2 protocol message onto the ESMC is performed within a destination border hybrid node by the synchronization network manager.

11. A method for distributing time according to claim 1, wherein the message of the IEEE 1588 V2 is encapsulated within a Multiprotocol Label Switching "MPLS" tunnel.

12. A source border hybrid node comprising means configured to:
receive an Ethernet Synchronization Messaging Channel "ESMC" message comprising at least one Type Length Value "TLV" field associated with a master clock value of a Synchronous Ethernet "SyncE" domain,
map the TLV fields of the EMSC message, at least one of which is associated with a master clock value, with additional Type Length Value "TLV" fields of a SYNC or ANNOUNCE message of the 1588V2 protocol,
encapsulate and transmit the SYNC or ANNOUNCE message comprising said additional TLV fields within a tunnel through a Synchronous Optical Networking/Synchronous Digital Hierarchy "SONET-SDH" domain.

13. A destination border hybrid node comprising means configured to:
receive and unencapsulate a SYNC or ANNOUNCE message of the 1588V2 protocol comprising Type Length Value "TLV" fields, at least one of which is associated with a master clock value, said message having been transmitted within a tunnel through a Synchronous Optical Networking/Synchronous Digital Hierarchy "SONET-SDH" domain,
map the TLV fields of the transmitted SYNC or ANNOUNCE message, at least one of which is associated with a master clock value, with Type Length Value "TLV" fields of a Ethernet Synchronization Messaging Channel "ESMC" message,
transmit the ESMC message comprising the TLV fields, at least one of which is associated with a master clock value, through a Synchronous Ethernet "SyncE" domain.

14. A source border hybrid node comprising means configured to:
receive an Ethernet Synchronization Messaging Channel "ESMC" message comprising Type Length Value "TLV" fields, at least one of which is associated with a master clock value of a Synchronous Ethernet "SyncE" domain,
determine the offset between the master clock value of the received SyncE domain and a master clock value of a Synchronous Optical Networking/Synchronous Digital Hierarchy "SONET-SDH" domain,
encode and insert the offset value within a field of an ANNOUNCE message of a 1588V2 protocol,
encapsulate and transmit the ANNOUNCE message comprising a field associated with a clock offset value within a tunnel through the SONET-SDH domain.

15. A destination border hybrid node comprising means configured to:
receive and unencapsulate an ANNOUNCE message of a 1588V2 protocol comprising a field associated with a clock domain value transmitted within a tunnel through a Synchronous Optical Networking/Synchronous Digital Hierarchy "SONET-SDH" domain,
retrieve the master clock value of the Synchronous Ethernet "SyncE" domain based on the master clock value of the SONET-SDH domain and the received clock offset value,
transmit an Ethernet Synchronization Messaging Channel "ESMC" message comprising a Type Length Value "TLV" field associated with the master clock value of the retrieved SyncE domain.

* * * * *